United States Patent
Ren et al.

(10) Patent No.: US 10,489,542 B2
(45) Date of Patent: Nov. 26, 2019

(54) MACHINE LEARNING BASED POST ROUTE PATH DELAY ESTIMATOR FROM SYNTHESIS NETLIST

(71) Applicant: NVIDIA Corp., Santa Clara, CA (US)

(72) Inventors: Mark Ren, Austin, TX (US); Brucek Khailany, Austin, TX (US)

(73) Assignee: NVIDIA Corp., Santa Clara, CA (US)

( * ) Notice: Subject to any disclaimer, the term of this patent is extended or adjusted under 35 U.S.C. 154(b) by 115 days.

(21) Appl. No.: 15/960,833

(22) Filed: Apr. 24, 2018

(65) Prior Publication Data

US 2019/0325092 A1    Oct. 24, 2019

(51) Int. Cl.
*G06F 17/50* (2006.01)
*G06N 3/08* (2006.01)
*G06N 3/04* (2006.01)

(52) U.S. Cl.
CPC ............. *G06F 17/505* (2013.01); *G06N 3/04* (2013.01); *G06N 3/08* (2013.01)

(58) Field of Classification Search
CPC ........... G06F 17/505; G06N 3/08; G06N 3/04
USPC ........................................................ 716/104
See application file for complete search history.

(56) References Cited

U.S. PATENT DOCUMENTS

| | | | |
|---|---|---|---|
| 2015/0117760 A1* | 4/2015 | Wang | G06K 9/66 382/157 |
| 2016/0335120 A1* | 11/2016 | Gupta | G06F 9/5044 |
| 2018/0253635 A1* | 9/2018 | Park | G06N 3/0454 |
| 2019/0138897 A1* | 5/2019 | Xu | G06F 17/5036 |

OTHER PUBLICATIONS

Spindler et al., "Fast and Accurate Routing Demand Estimation for Efficient Routability-driven Placement", *IEEE Design, Automation & Test in Europe Conference & Exhibition*, Apr. 16, 2007.

* cited by examiner

*Primary Examiner* — Jack Chiang
*Assistant Examiner* — Brandon Bowers
(74) *Attorney, Agent, or Firm* — Rowan TELS LLC

(57) ABSTRACT

A neural network including an embedding layer to receive a gate function vector and an embedding width and alter a shape of the gate function vector by the embedding width, a concatenator to receive a gate feature input vector and concatenate the gate feature input vector with the gate function vector altered by the embedding width, a convolution layer to receive a window size, stride, and output feature size and generate an output convolution vector with a shape based on a length of the gate function vector, the window size of the convolution layer, and the output feature size of the convolution layer, and a fully connected layer to reduce the gate output convolution vector to a final path delay output.

17 Claims, 6 Drawing Sheets

MACHINE LEARNING BASED POST ROUTE PATH DELAY ESTIMATOR FROM SYNTHESIS NETLIST

BACKGROUND

Very-large-scale integration (VLSI) design teams strive to build high 'quality of result' (QoR) products. One way to increase QoR is by exploring a large design space during the synthesis stage. However, the backend flow (described further below) may take a long time (days) to complete and, thus, evaluate a final post route QoR from the synthesis stage. Therefore, it is important to be able to predict QoR in the synthesis stage, or earlier stages of the backend flow.

One challenge of predicting post route QoR, such as the path delay between two sequential points from the synthesis stage, is that the paths at the synthesis stage are not the same as those at the post route stage. The backend design flow may change these combinational paths. It may place all the gates and route all the nets. It may also add buffers, resize gates, and change the circuit structures. In the end, the combinational paths may be significantly different to those at the synthesis stage. The large routing parasitic created by routing through congested regions may also make wire load different between the post route and the synthesis stages. These issues create a problem for the design space exploration process because the timing analysis at the synthesis stage cannot accurately estimate the timing at the post route stage.

Another problem is that synthesis optimization based on its own timing analysis might not achieve the optimal results either, because it might work on the wrong critical paths. Conventional solutions include physical design at the synthesis stage, for example, integrating congestion estimation in the synthesis stage. However, these solutions are time consuming and do not provide an accurate prediction of all potential changes to the netlist in the backend flow.

BRIEF SUMMARY

The disclosed method utilizes machine learning technology to predict post route path delay from a synthesis stage netlist. In one embodiment, convolution neural networks are utilized to model the path delay based on the input features collected from a placement on the synthesis netlist. Other neural networks and machine-learning based approaches may also be utilized.

The method is data driven instead of algorithm driven. The prediction model is fit from the real design output generated by the backend tools, without knowledge of the backend algorithm details. At inference time, the prediction model executes efficiently, and does not add significantly to the synthesis runtime. Fast and accurate path delay estimation helps improve the efficiency of, and reduce the time for, design space exploration based on the synthesis netlist. Efficient design space exploration enables identification of designs with better QoR, which enables the production of improved microchip products. Furthermore, the present system improves timing optimization in the backend flow and/or the engineering change order (ECO) flow that utilize the predicted path delay in their operations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
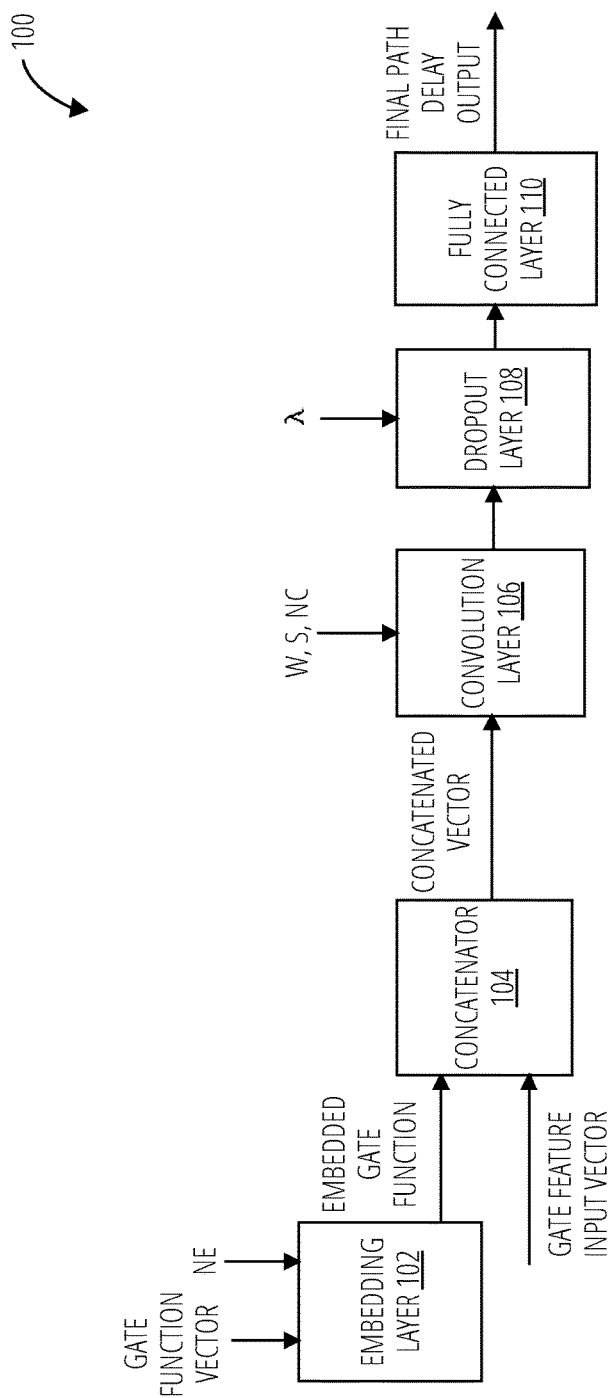
FIG. 1 illustrates an embodiment of a neural network 100.

Disclosed herein are processes and systems that improve the efficiency of machines that generate control structures (e.g., post-route/placement netlist logic, maskworks) input by other machines to manufacture complex electronic circuitry. The processes and systems generate post-routing path delay readings faster and with more accuracy than conventional systems, and thus improve timing optimization in the control structures used by machines that manufacture microchip products. For example the control structures generated using the disclosed processes and systems may be utilized to generate post-route netlist logic that is transformed into maskworks which in turn operate photolithographic equipment that manufactures microchips. The disclosed processes and systems are thus improvements to the efficiency and computerization of the inherently technological process of manufacturing microchips and lead directly to faster and more efficient microchips.

A machine learning system is disclosed that utilizes input features extracted from all gates on a timing path. For each gate, the following features may be extracted: 1) gate function; 2) gate logic effort; 3) gate output fanout; 4) output Manhattan distance; 5) gate delay; 6) gate output slew; 7) gate output capacitance; and 8) routing congestion estimation of the output net.

The gate function, $GF_g$, represents the fundamental gate logic function, e.g. inverter (INV), AND-OR-Inverter (AOI), etc. This function may be identified by a string in the standard cell library file(s) for the gate. In some embodiments, the input number variation of the gate function is discarded, e.g., both AOI22 and AOI32 are both represented as AOI.

The gate logic effort, $L_g$, is the ratio of the input capacitance of a gate to the input capacitance of an inverter delivering the same output current. The gate logic effort is independent of the gate sizing. This feature is utilized to account for the function logic of a gate in the timing path. It may be determined by simulation as follows. First, the delay of an inverter is simulated at several fanouts (e.g., 2, 4, and 6). Then the delay is fit to Equation (1):

$$t = \alpha_{inv} + \beta_{inv} f \qquad \text{Equation 1}$$

In Equation 1, $\alpha$ and $\beta$ are linear regression generated parameters, where a is the gate parasitic delay and $\beta*f$ represents the effort delay ($\beta$ represents the logic effort, f represents the electrical effort). The logic effort of a gate is expressed as multiple of the logic effort of an inverter.

Next, the delay of a gate of interest is fitted to Equation (2):

$$t = \alpha_{gate} + \beta_{gate} f \qquad \text{Equation 2}$$

Once obtained, the logical effort, $L_g$, is then be calculated utilizing Equation 3:

$$L_g = \beta_{gate}/\beta_{inv} \quad \text{Equation 3}$$

The logic effort is thus derivable from intrinsic properties of the gate and may be pre-computed from the cell library for the gate.

The gate output fanout, $F_g$ or $F_{gate}$, is the fanout for the gate as indicated in the synthesis netlist. The output Manhattan distance, $X_g$, $Y_g$, is the Manhattan distance from a current output pin to a next input pin on the path. The gate output capacitance, $C_g$, includes the output net capacitance and the capacitance of all sink pins on the output net. The gate delay, $D_g$, is calculated based on Non-Linear Delay Models (NLDM) and may be provided by static timing analysis (STA) tools. The gate output slew is also calculated based on NLDM and may be provided by STA tools.

The routing congestion estimation of the output net, $R^{avg}_g$ and $R^{max}_g$, is calculated based on the rectangular uniform wire density per net (RUDY) method. To estimate routing congestion, the chip area is first divided into a uniform grid. For each grid patch (grid(x,y)), a routing demand D(x,y) on grid (x,y) is determined based on Equation (4):

$$D(x,y) = \sum_{n=1}^{N} d_n \times R(x,y; x_n, y_n, w_n, h_n) \quad \text{Equation 4}$$

where n represents a net from 1 to N; $x_n$, $y_n$ represent the x, y positions of the lower left bounding box of net n; $w_n$, $h_n$ represent the window size and height of the bounding box of net n; $d_n$ represents the uniform wire density of net n per Equation (5); N is the number of all nets in the design:

$$d_n = \frac{L_n p}{w_n h_n} \quad \text{Equation 5}$$

where $L_n$ is the half perimeter wirelength (HPWL) of net n; p is the wiring window size, which can be estimated as the average wire-to-wire pitch divided by the number of routing layers; $R(x, y; x_n, y_n, w_n, h_n)$ represents the routing coverage of net n over a grid on (x,y) per Equation (6):

$$R(x, y; x_n, y_n, w_n, h_n) = \begin{cases} 1 & \text{if } 0 \leq x - x_n \leq w_n \wedge 0 \leq y - y_n \leq h_n \\ 0 & \text{else} \end{cases} \quad \text{Equation 6}$$

The gate output net congestion estimation includes the average congestion, $R^{avg}_g$, and maximum congestion, $R^{max}_g$, which are estimated per Equations (7) and (8):

$$R^{avg}_g = \sum_{x,y}^{0 \leq x - x_n \leq w_n \wedge 0 \leq y - y_n \leq h_n} \frac{D(x, y)}{w_n h_n} \quad \text{Equation 7}$$

$$R^{max}_g = \max_{0 \leq x - x_n \leq w_n \wedge 0 \leq y - y_n \leq h_n} \frac{D(x, y)}{w_n h_n} \quad \text{Equation 8}$$

which are the average and the maximum routing demands in the output net bounding box, respectively.

Referring to FIG. 1, a neural network 100 comprises an embedding layer 102, a concatenator 104, a convolution layer 106, a dropout layer 108, and a fully connected layer 110.

The embedding layer 102 receives a gate function vector and an embedding width, NE. The gate function vector has a dimension of (K, 1), and each element is an integer that represents the $GF_g$ of each gate on the path, where $GF_g$ represents logic functions such as NAND, NOR, AND, etc. The string format of $GF_g$ is converted into an integer using a categorical encoding method, which assigns a different integer to each unique string. The embedding layer 102 converts each categorical integer into a vector of embedding width, NE, and sends the output to the concatenator 104. In some embodiments, the value of NE is 1. The output of the embedding layer 102 has a shape (i.e., dimensionality) of (K, NE). In some embodiments, prior to the embedding layer 102 receiving the gate function vector, the maximum path length, K, that is, the maximum number of gates on a path, is determined. The input data is padded with zeros to fit the maximum path length K. When an unseen path (a path not used in the training model) with a length exceeding K feeds into the model, the vector may be truncated by removing the last elements to fit length K. In some embodiments, the value of K is 51.

The concatenator 104 receives the output of the embedding layer 102 and the gate feature input vector. The gate feature input vector includes the other input features for each gate, such as the gate logic effort, the gate output fanout, the output Manhattan distance, the gate delay, the gate output slew, the gate output capacitance, and the routing congestion estimation of the output net. The gate feature input vector may have a length of the input gate feature, NI, and a shape of (K, NI), where NI is training-data specific. In some embodiments, the value of NI is 5. The concatenator 104 concatenates the output of the embedding layer 102 and the gate feature input vector. The concatenated vector is a vector of (K, NE+NI) and is sent to the convolution layer 106.

The convolution layer 106 receives the concatenated vector and a window size of W, stride of S, and output feature size of NC. In some embodiments, the value of W, S, and NC is 4, 1, and 1, respectively (values chosen based on the training data). The convolution layer 106 may be a 1D convolution layer. The convolution layer 106 may utilize the rectified linear unit (ReLU) as the activation function. The output of the convolution layer 106 has a shape of (K−W+1, NC). This output convolution vector is sent to the dropout layer 108.

The dropout layer 108 receives the output of the convolution layer 106 and a dropout factor of λ. The dropout layer 108 may be included to inhibit overfitting. In some embodiments, the value of λ is 0.1 based on the training data. The output of the dropout layer 108 has a shape of (K−W+1, NC). This output is sent to the fully connected layer 110.

The fully connected layer 110 receives the output of the dropout layer 108 and produces the final path delay output. The fully connected layer 110 may utilize the ReLu activation function. The output may be a floating-point number representing the final path delay. The fully connected layer 110 may utilize the mean square error as the objective function.

Figure 2:
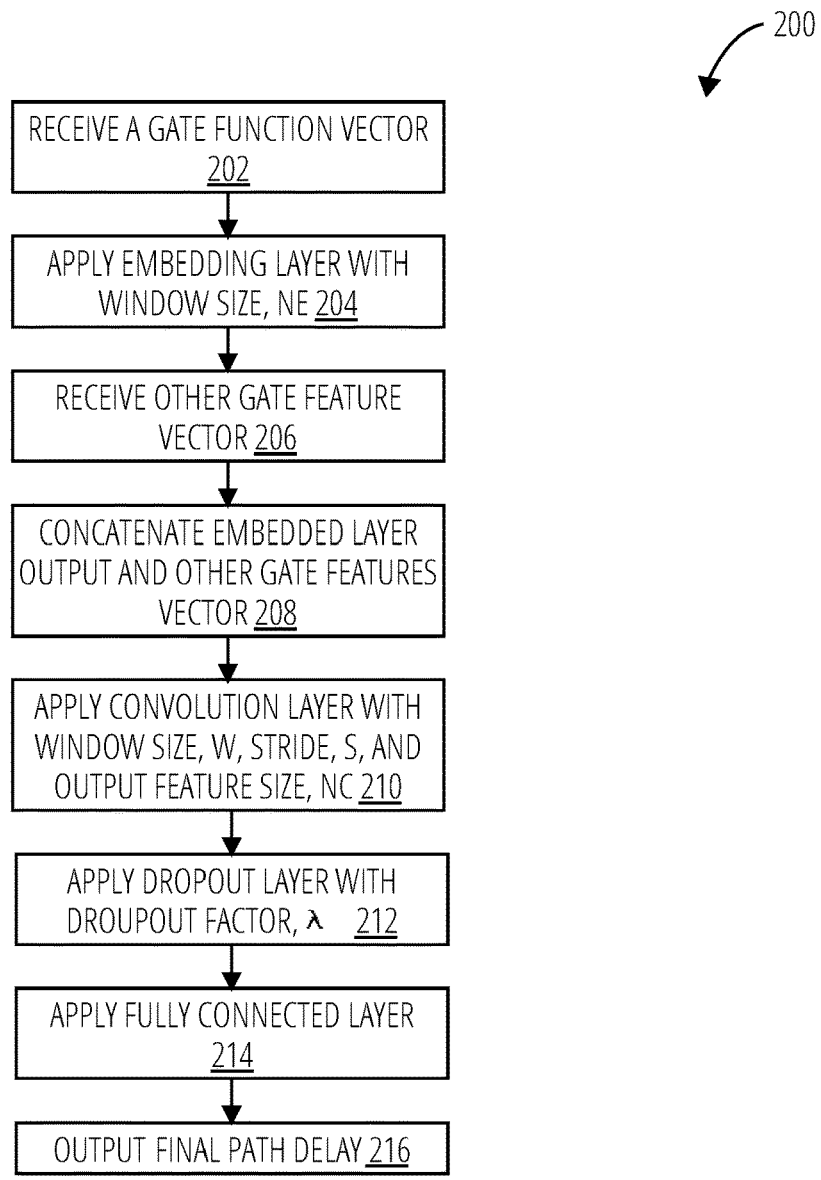
FIG. 2 illustrates an embodiment of a path delay output method 200.

Referring to FIG. 2, a path delay output method 200 receives a gate function vector (block 202). The shape of the gate function vector may be (K, 1), where K is the maximum number of gates on a path. In some embodiments, K is 51. The vector may have integer values associated with the string values of the gates. The vector may additionally be padded with zeros. An embedding layer is applied to the gate function vector (block 204). The embedding layer may have an embedding width, NE, where NE, in some embodiments, has a value of 1. Another gate feature vector is then received (block 206). The other gate feature vector may have a shape (K, NI), and NI may have a value of 5. The other gate features may include the gate logic effort, the gate output fanout, the output Manhattan distance, the gate delay, the gate output slew, the gate output capacitance, and the routing congestion estimation of the output net. The output of the embedding layer and the other gate features vector are then concatenated (block 208). A convolution layer is applied to the concatenated vector (block 210). The convolution layer has a window size (W), a stride (S), and an output feature size (NC). In some embodiments, the values of W, S, and NC are 4, 1, and 1, respectively. The convolution layer may utilize a ReLU activation function. A dropout layer is applied (block 212). The dropout layer has a dropout factor, which, in some embodiments, has a value of 0.1. The dropout layer may reduce over-fitting. A fully connected layer is then applied (block 214) to output the final path delay (block 216). In some embodiments, the fully connected layer utilizes a ReLU activation function and mean square error as the objective function.

Figure 3:
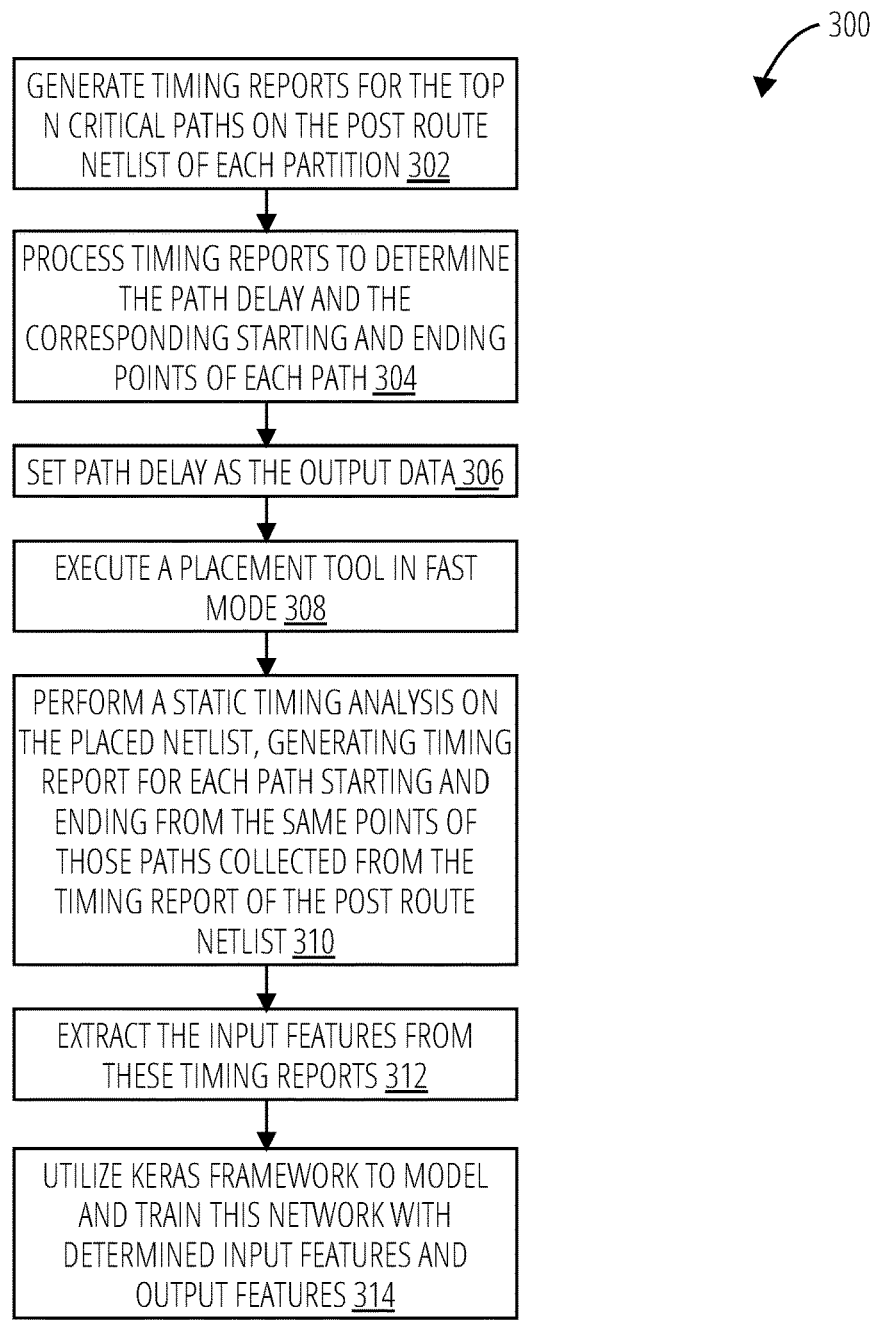
FIG. 3 illustrates an embodiment of a training method 300.

Referring to FIG. 3, a training method 300 generates timing values for the top N critical paths on the post route netlist of each partition (block 302). A signoff STA tool may be utilized. The timing values are processed to determine the path delay and the corresponding starting and ending points of each path (block 304). The path delay is set as the output data (block 306). A placement tool is executed in fast mode (block 308). A fast mode placement is a process in which the placement engine logic performs a rough optimization. It is often an order of magnitude fast with only a single or low double-digit percentage loss in optimality. Fast placement is executed on the synthesis netlist, not the post-route netlist.

The placement tool may be Synopsys ICC2 placement command. The macro floorplan may be fixed prior to placement. A static timing analysis is performed on the placed netlist, generating timing values for each path starting and ending from the same points of those paths collected from the timing values of the post route netlist (block 310). The input features are extracted from these timing values (block 312). A Keras framework is utilized to model and train this network with determined input features and output features (block 314). In some embodiments, the input features other than the gate function may be scaled to (0, 1) range. The output may not be scaled.

More accurate estimation on critical paths may be achieved by weighting training samples. The weighting may assign higher sample weights on paths with longer delays and lower sample weights on paths with shorter delays. The sample weight can be calculated per Equation (9).

$$w = \begin{cases} 1 + W(d - d_c) & d > d_c \\ 1 & d \leq d_c \end{cases} \quad \text{Equation 9}$$

where d is the path delay, $d_c$ is the critical path delay, and W is the weight emphasis on the critical path. In one embodiment the weight is set between 10-100, to create an order of magnitude difference between critical and non-critical paths.

Figure 4:
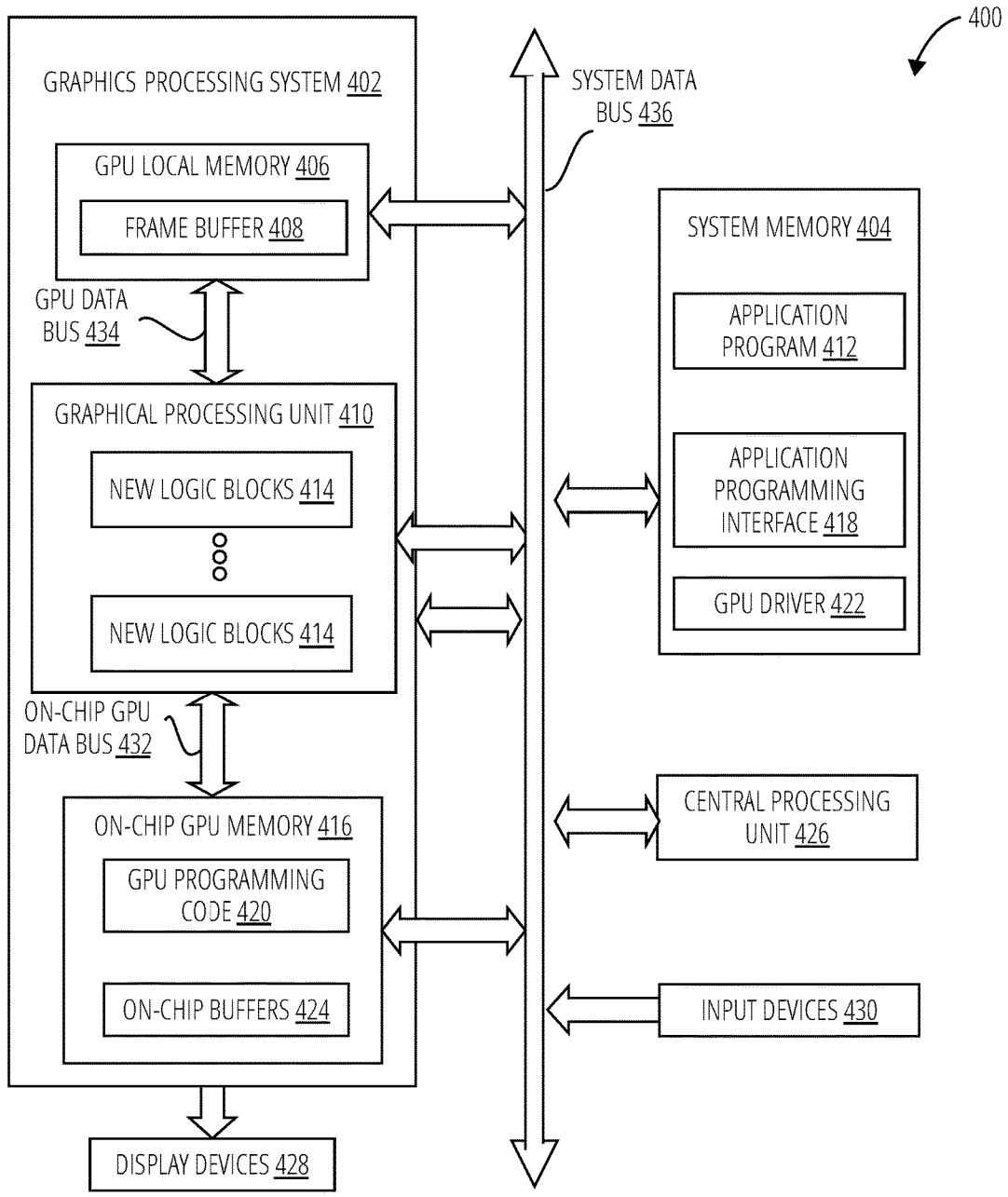
FIG. 4 is a block diagram of a computing system 400 within which the GPU or method introduced herein may be embodied or carried out.

FIG. 4 is a block diagram of one embodiment of a computing system 400 in which one or more aspects of the invention may be implemented. The computing system 400 includes a system data bus 436, a CPU 426, input devices 430, a system memory 404, a graphics processing system 402, and display devices 428. In alternate embodiments, the CPU 426, portions of the graphics processing system 402, the system data bus 436, or any combination thereof, may be integrated into a single processing unit. Further, the functionality of the graphics processing system 402 may be included in a chip set or in some other type of special purpose processing unit or co-processor.

As shown, the system data bus 436 connects the CPU 426, the input devices 430, the system memory 404, and the graphics processing system 402. In alternate embodiments, the system memory 404 may connect directly to the CPU 426. The CPU 426 receives user input from the input devices 430, executes programming instructions stored in the system memory 404, operates on data stored in the system memory 404, and configures the graphics processing system 402 to perform specific tasks in the graphics pipeline. The system memory 404 typically includes dynamic random access memory (DRAM) employed to store programming instructions and data for processing by the CPU 426 and the graphics processing system 402. The graphics processing system 402 receives instructions transmitted by the CPU 426 and processes the instructions to render and display graphics images on the display devices 428.

As also shown, the system memory 404 includes an application program 412, an API 418 (application programming interface), and a graphics processing unit driver 422 (GPU driver). The application program 412 generates calls to the API 418 to produce a desired set of results, typically in the form of a sequence of graphics images. The application program 412 also transmits zero or more high-level shading programs to the API 418 for processing within the graphics processing unit driver 422. The high-level shading programs are typically source code text of high-level programming instructions that are designed to operate on one or more shading engines within the graphics processing system 402. The API 418 functionality is typically implemented within the graphics processing unit driver 422. The graphics processing unit driver 422 is configured to translate the high-level shading programs into machine code shading programs that are typically optimized for a specific type of shading engine (e.g., vertex, geometry, or fragment).

The graphics processing system 402 includes a GPU 410 (graphics processing unit), an on-chip GPU memory 416, an on-chip GPU data bus 432, a GPU local memory 406, and a GPU data bus 434. The GPU 410 is configured to communicate with the on-chip GPU memory 416 via the on-chip GPU data bus 432 and with the GPU local memory 406 via the GPU data bus 434. The GPU 410 may receive instructions transmitted by the CPU 426, process the instructions to render graphics data and images, and store these images in the GPU local memory 406. Subsequently, the GPU 410 may display certain graphics images stored in the GPU local memory 406 on the display devices 428.

The GPU 410 includes one or more logic blocks 414. The logic blocks 414 may implement aspects of the methods described in conjunction with FIGS. 1-3.

The GPU 410 may be provided with any amount of on-chip GPU memory 416 and GPU local memory 406, including none, and may employ on-chip GPU memory 416, GPU local memory 406, and system memory 404 in any combination for memory operations.

The on-chip GPU memory 416 is configured to include GPU programming 420 and on-Chip Buffers 424. The GPU programming 420 may be transmitted from the graphics processing unit driver 422 to the on-chip GPU memory 416 via the system data bus 436. The GPU programming 420 may include a machine code vertex shading program, a machine code geometry shading program, a machine code fragment shading program, or any number of variations of each. The on-Chip Buffers 424 are typically employed to store shading data that requires fast access to reduce the latency of the shading engines in the graphics pipeline.

Because the on-chip GPU memory 416 takes up valuable die area, it is relatively expensive.

The GPU local memory 406 typically includes less expensive off-chip dynamic random access memory (DRAM) and is also employed to store data and programming employed by the GPU 410. As shown, the GPU local memory 406 includes a frame buffer 408. The frame buffer 408 stores data for at least one two-dimensional surface that may be employed to drive the display devices 428. Furthermore, the frame buffer 408 may include more than one two-dimensional surface so that the GPU 410 can render to one two-dimensional surface while a second two-dimensional surface is employed to drive the display devices 428.

The display devices 428 are one or more output devices capable of emitting a visual image corresponding to an input data signal. For example, a display device may be built using a cathode ray tube (CRT) monitor, a liquid crystal display, or any other suitable display system. The input data signals to the display devices 428 are typically generated by scanning out the contents of one or more frames of image data that is stored in the frame buffer 408.

Figure 5:
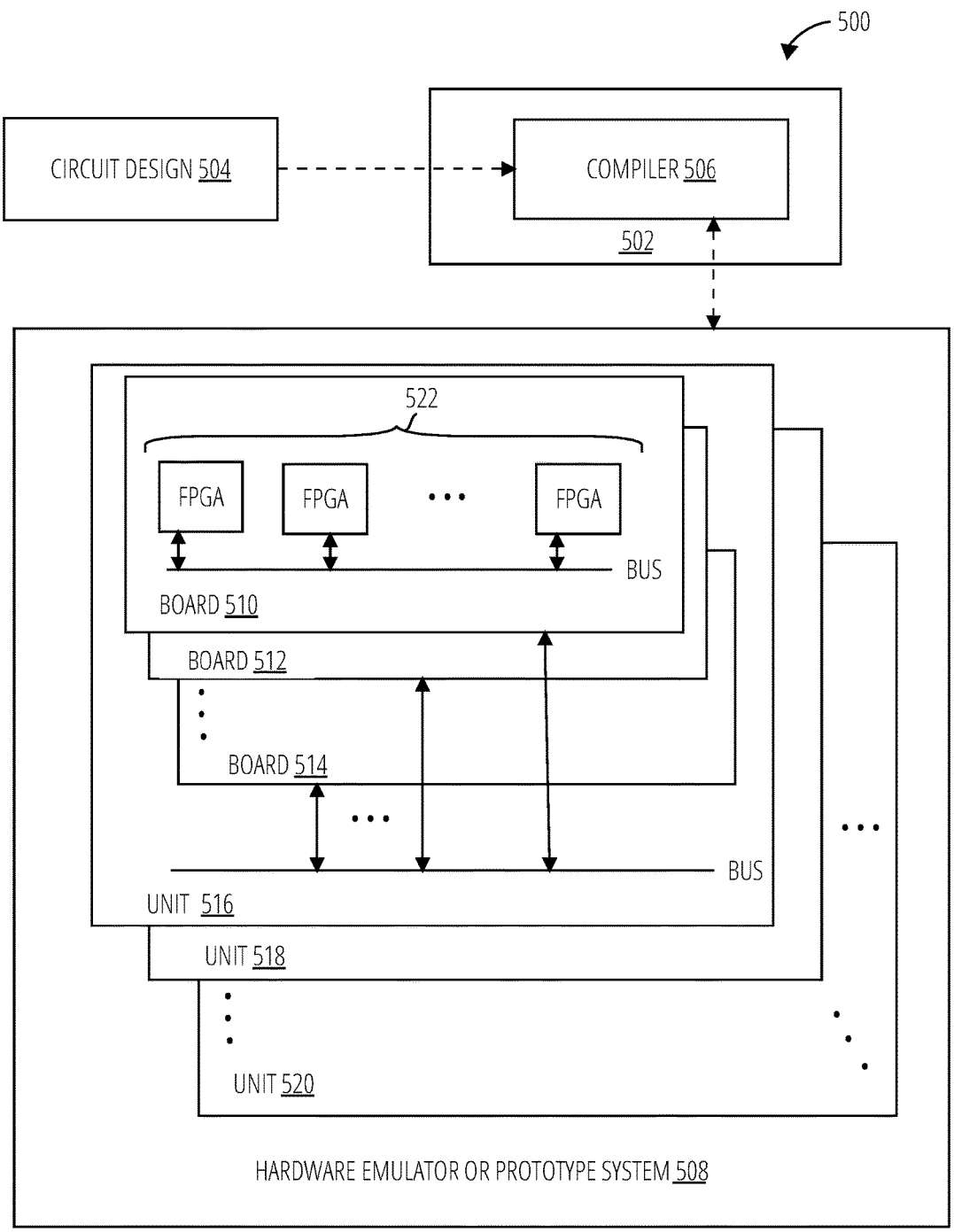
FIG. 5 is an exemplary high-level block diagram of a hardware verification system 500, in accordance with one embodiment of the present invention.

FIG. 5 is an exemplary high-level block diagram of a hardware verification system 500, in accordance with one embodiment of the present invention. The hardware verification system 500 may be used to verify, test or debug a circuit design 504. The hardware verification system 500 may include a hardware emulator or prototype system 508 and a computer system including aspects such as disclosed in FIG. 4 and FIG. 6. As depicted in FIG. 5, the hardware emulator or prototype system 508 may be coupled to the computer system (e.g, see FIG. 6), which may include a compiler 506 module that may receive a hardware description language (HDL) representation of the circuit design 504.

The compiler 506 may include a multitude of various software modules that may or may not include a dedicated compiler module. The compiler 506 may transform, change, reconfigure, add new functions to, and/or control the timing of the circuit design 504 to facilitate verification, emulation, or prototyping of the circuit design 504. Further, the compiler 506 may compile the circuit design 504 and any associated changes into a binary image used to program the hardware emulator or prototype system 508.

Thus the logical functions and timing of the circuit design 504 that may ultimately be implemented by hardware in an integrated circuit chip may instead be first implemented in the hardware emulator or prototype system 508. Among other advantages, verification of the circuit design 504 in hardware may be accomplished at much higher speed than by software verification alone.

The hardware emulator or prototype system 508 may include a multitude of emulator units (e.g., unit 516, unit 518, . . . unit 520) each comprising one or more circuit boards (e.g., board 510, board 512, . . . board 514). Each board may comprise one or more programmable processors 522, such a Field Programmable Gate Arrays (FPGAs) and/or GPUs, and other blocks (not shown), such as memories, input/output devices, other processors, and the like. The hardware emulator or prototype system 508 receives a compiled circuit design 504 from the compiler 506, and programs the programmable processors 522 to verify behavior of the circuit design. The hardware emulator or prototype system 508 may include a primary or master system clock from which a number of other clock signals may be generated.

Figure 6:
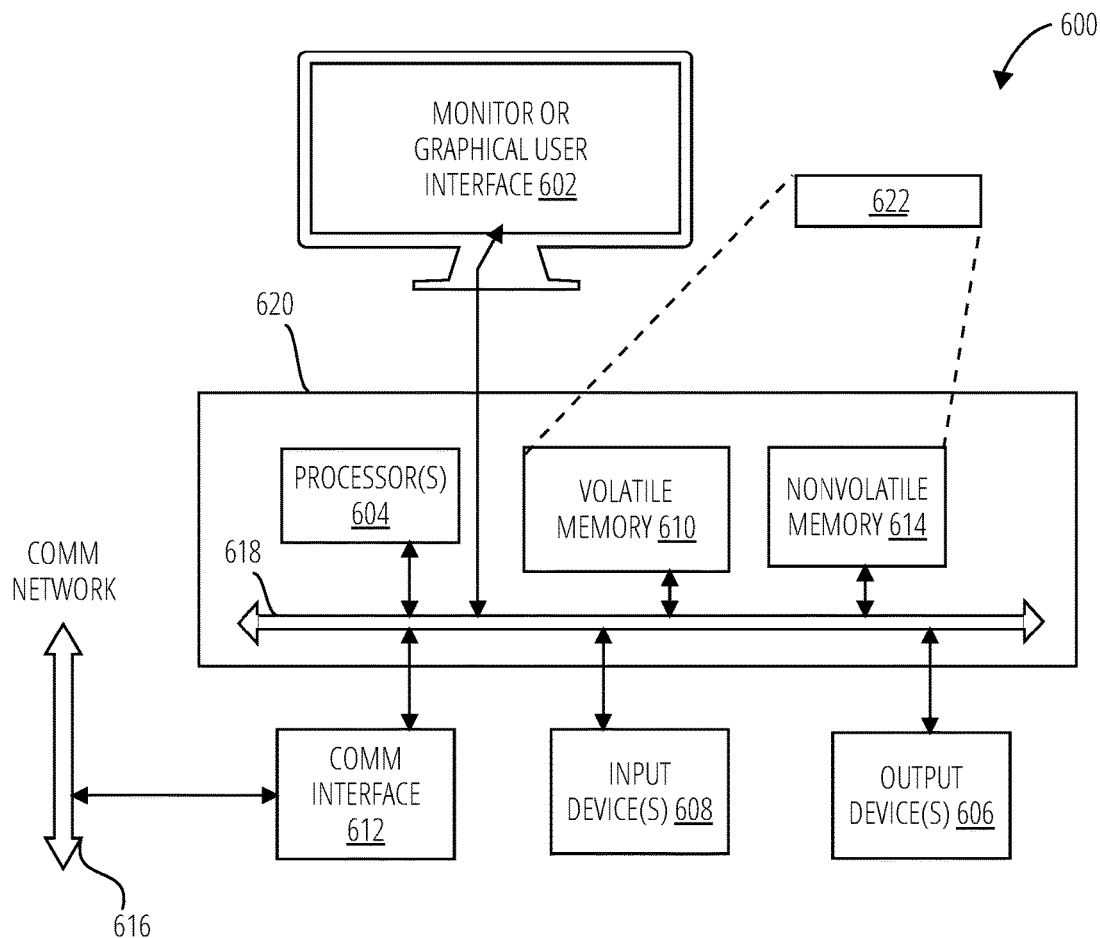
FIG. 6 is an example block diagram of a computing device 600 that may incorporate embodiments of the present invention.

FIG. 6 is an example block diagram of a computing device 600 that may incorporate embodiments of the present invention. FIG. 6 is merely illustrative of a machine system to carry out aspects of the technical processes described herein, and does not limit the scope of the claims. One of ordinary skill in the art would recognize other variations, modifications, and alternatives. In one embodiment, the computing device 600 typically includes a monitor or graphical user interface 602, a data processing system 620, a communication network interface 612, input device(s) 608, output device(s) 606, and the like.

As depicted in FIG. 6, the data processing system 620 may include one or more processor(s) 604 that communicate with a number of peripheral devices via a bus subsystem 618. These peripheral devices may include input device(s) 608, output device(s) 606, communication network interface 612, and a storage subsystem, such as a volatile memory 610 and a nonvolatile memory 614.

The volatile memory 610 and/or the nonvolatile memory 614 may store computer-executable instructions and thus forming logic 622 that when applied to and executed by the processor(s) 604 implement embodiments of the methods disclosed herein.

The input device(s) 608 include devices and mechanisms for inputting information to the data processing system 620. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a track pad, a joystick, wireless remote, drawing tablet, voice command system, eye tracking system, and the like. The input device(s) 608 typically allow a user to select objects, icons, control areas, text and the like that appear on the monitor or graphical user interface 602 via a command such as a click of a button or the like.

The output device(s) 606 include devices and mechanisms for outputting information from the data processing system 620. These may include the monitor or graphical user interface 602, speakers, printers, infrared LEDs, and so on as well understood in the art.

The communication network interface 612 provides an interface to communication networks (e.g., communication network 616) and devices external to the data processing system 620. The communication network interface 612 may serve as an interface for receiving data from and transmitting data to other systems. Embodiments of the communication network interface 612 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 612 may be coupled to the communication network 616 via an antenna, a cable, or the like. In some embodiments, the communication network interface 612 may be physically integrated on a circuit board of the data processing system 620, or in some cases may be implemented in software or firmware, such as "soft modems", or the like.

The computing device 600 may include logic that enables communications over a network using protocols such as HTTP, TCP/IP, RTP/RTSP, IPX, UDP and the like.

The volatile memory 610 and the nonvolatile memory 614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 610 and the nonvolatile memory 614 may be configured to store the basic programming and data constructs that provide the functionality of the disclosed processes and other embodiments thereof that fall within the scope of the present invention.

Logic 622 that implements embodiments of the present invention may be stored in the volatile memory 610 and/or the nonvolatile memory 614. Said logic 622 may be read from the volatile memory 610 and/or nonvolatile memory 614 and executed by the processor(s) 604. The volatile memory 610 and the nonvolatile memory 614 may also provide a repository for storing data used by the logic 622.

The volatile memory 610 and the nonvolatile memory 614 may include a number of memories including a main random access memory (RAM) for storage of instructions and data during program execution and a read only memory (ROM) in which read-only non-transitory instructions are stored. The volatile memory 610 and the nonvolatile memory 614 may include a file storage subsystem providing persistent (non-volatile) storage for program and data files. The volatile memory 610 and the nonvolatile memory 614 may include removable storage systems, such as removable flash memory.

The bus subsystem 618 provides a mechanism for enabling the various components and subsystems of data processing system 620 communicate with each other as intended. Although the communication network interface 612 is depicted schematically as a single bus, some embodiments of the bus subsystem 618 may utilize multiple distinct busses.

It will be readily apparent to one of ordinary skill in the art that the computing device 600 may be a device such as a smartphone, a desktop computer, a laptop computer, a rack-mounted computer system, a computer server, or a tablet computer device. As commonly known in the art, the computing device 600 may be implemented as a collection of multiple networked computing devices. Further, the computing device 600 will typically include operating system logic (not illustrated) the types and nature of which are well known in the art.

Terminology and Interpretation

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

"Activation function" in this context refers to a function that defines the output of a node given an input or set of inputs.

"Convolution layer" in this context refers to a neural network layer comprising parameters that include a set of learnable filters (or kernels), which have a small receptive field, but extend through the full depth of the input volume.

"Dropout layer" in this context refers to a layer providing a regularization technique for reducing overfitting in neural networks by preventing complex co-adaptations on training data by dropping out units (both hidden and visible) in a neural network.

"Embedding layer" in this context refers to a layer that turns positive integers (indexes) into dense vectors of fixed size.

"Embedding width" in this context refers to a parameter that determines the size of the output of an embedded layer.

"Fully connected layer" in this context refers to a layer that connect every neuron in one layer to every neuron in another layer.

"Gate feature input vector" in this context refers to a vector comprising parameters utilized to determine the final path delay, other than the gate function.

"Gate function vector" in this context refers to a vector comprising strings, or integers representing the strings, of logic gates, such as AND, OR, XOR, NOT, NAND, NOR, XNOR, etc.

"Mean square error function" in this context refers to a function that measures the average of the squares of the errors or deviations—that is, the difference between the estimator and what is estimated.

"Neural network" in this context refers to a collection of connected units or nodes called artificial neurons. Each connection between artificial neurons can transmit a signal from one to another. The artificial neuron that receives the signal can process it and then signal artificial neurons connected to it.

"Objective function" in this context refers to a function o be maximized or minimized.

"Rectified linear unit" in this context refers to an activation function defined as the positive part of its argument: $f(x)=\max(0,x)$, where x is the input to a neuron.

"Stride" in this context refers to the step of the convolution operation.

"Synthesis netlist" in this context refers to a description of the connectivity of an electronic circuit.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A device for generation a circuit fabrication structure, the device comprising:
   neural network logic, comprising
      an embedding layer to:
         receive a gate function vector and an embedding width; and
         alter a shape of the gate function vector by the embedding width;
      a concatenator to:
         receive a gate feature input vector; and
         concatenate the gate feature input vector with the gate function vector altered by the embedding width;
      a convolution layer to:
         receive a window size, stride, and output feature size; and
         generate an output convolution vector with a shape based on a length of the gate function vector, the window size of the convolution layer, and the output feature size of the convolution layer;
      a fully connected layer to reduce the output convolution vector to a final circuit path delay output; and
      logic to utilize the final circuit delay output in a circuit fabrication structure.

2. The device of claim 1, the neural network further comprising a dropout layer to:
   receive the output convolution vector and a dropout factor;
   regularize the output convolution vector based on the dropout factor; and
   send the output convolution vector that has been regularized to the fully connected layer.

3. The device of claim 2, wherein the dropout factor is 0.1.

4. The device of claim 2, wherein the embedding layer has the embedding width of 1.

5. The device of claim 1, wherein the convolution layer is a 1D convolution layer.

6. The device of claim 1, wherein the window size is 4, the stride is 1, and the output feature size is 1.

7. The device of claim 1, wherein the convolution layer of the neural network utilizes a rectified linear unit as an activation function.

8. The device of claim 1, wherein the fully connected layer of the neural network utilizes a rectified linear unit as an activation function.

9. The device of claim 1, wherein the fully connected layer of the neural network utilizes a mean square error function as an objective function.

10. The device of claim 1, wherein the gate feature input vector comprises one or more of a gate output fanout, an output Manhattan distance, a gate delay, and a gate output slew.

11. The device of claim 10, further including one or more of a gate logic effort, a gate output capacitance, an average routing congestion estimation, and a maximum routing congestion estimation.

12. The device of claim 1, wherein the gate function vector and the gate feature input vector are determined from a microchip design.

13. The device of claim 12, wherein the gate function vector and the gate feature input vector are collected from placements on a synthesis netlist.

14. The device of claim 1, wherein a size of the gate function vector is determined from a maximum number of gates on a circuit path.

15. The device of claim 14, the gate function vector truncated to the maximum number of gates on the path.

16. The device of claim 14, wherein the maximum number of gates on the path has a value of 51.

17. The device of claim 14, wherein the gate function vector is converted from a string input to an integer input by a categorical encoding method.

* * * * *